United States Patent [19]

Frisque

[11] Patent Number: 4,946,232
[45] Date of Patent: Aug. 7, 1990

[54] VARIABLY CURVED REFLECTOR FOR PROJECTING LUMINOUS LINES ON AN OBJECT BY A LASER BEAM

[76] Inventor: Andrew P. Frisque, 23456 Vallarta, Laguna Niguel, Calif. 92677

[21] Appl. No.: 261,660

[22] Filed: Oct. 24, 1988

[51] Int. Cl.$^5$ .............................................. G02B 26/10
[52] U.S. Cl. ...................................... 350/6.5; 350/486
[58] Field of Search ........................... 350/6.5, 486, 6.6

[56] References Cited

U.S. PATENT DOCUMENTS 3,826,576  7/1974  Stewart .............................. 356/384
4,693,567  9/1987  Ozaki ................................. 350/443

FOREIGN PATENT DOCUMENTS 0114115  7/1982  Japan ................................... 350/6.5
0155121  6/1988  Japan ................................... 350/6.5

Primary Examiner—Bruce Y. Arnold
Assistant Examiner—Ronald M. Kachmarik
Attorney, Agent, or Firm—W. Edward Johansen

[57] ABSTRACT

A variably curved reflector for projecting a luminous line on an object is used with a laser system which provides a laser beam. The variably curved reflector includes a variably curved reflecting surface and a pair of curved side surfaces and is located at a position subsequent to the laser system. The variably curved reflecting surface has a pair of parallelly disposed peripheral edges. Each curved side surface interects along one of the peripheral edges. The variably curved reflecting surface reflects the laser beam to form a plane of light which has an angular span which is determined by the radius of curvature at the point of contact along the variably curved reflecting surface.

1 Claim, 1 Drawing Sheet

VARIABLY CURVED REFLECTOR FOR PROJECTING LUMINOUS LINES ON AN OBJECT BY A LASER BEAM

BACKGROUND OF THE INVENTION

1. Field of the Invention

The present invention relates to a curved reflector for use in projecting a luminous line on an object by a laser beam and more particularly to a variably curved reflector the use of which enables the spatial configuration of the luminous line to be selectively altered and which is of simple construction.

2. Description of the Prior Art

U.S. Pat. No. 4,693,567, entitled Apparatus for Projecting Luminous Lines on an Object by a Laser Beam, issued to Yasuto Ozakii on Sept. 15, 1987, teaches an apparatus which projects luminous lines on an object by use of a laser beam and which includes a laser system, a lens assembly and a curved reflector. The laser system produces a laser beam. The lens assembly is located at a position subsequent to the laser system and expands the laser beam. The lens assembly includes a concave lens and a convex lens. The concave lens diverges the laser beam. The convex lens is positioned subsequent to the concave lens. The convex lens converges the laser beam to be of a maximum desired width. The curved reflector has a central plane and is located at a position subsequent to the convex lens with the optical axis of the laser beam which extends in the central plane. The curved reflector has a pair of curved side reflecting surfaces which interect along an edge of the reflector. The edge lies in the central plane. The reflecting surfaces diverge symmetrically from opposite sides of the central plane in directions away from the convex lens. The pair of reflecting surfaces thereby reflect the laser beam at different angles with respect to the central plane at respective different positions along the pair of reflecting surfaces and reflect a pair of sector-shaped luminous lines on an object. The sector-shaped luminous lines expand symmetrically from the side reflecting surfaces. The curved reflector has a curved top reflecting surface which extends transverse to and intersects the pair of side reflecting surfaces which extend perpendicular to the central plane. The central plane symmetrically bisects the top curved reflecting surface. The top reflecting surface reflects at different angles at a respective different portions along the top curved reflecting surface and reflect further sector-shaped luminous lines on the object. The luminous lines expand symmetrically from the curved top reflecting surface in directions perpendicular to the pair of sector-shaped luminous lines.

U.S. Pat. No. 3,826,576, entitled Laser Measuring or Monitoring System, issued to Eugene E. Stewart on July 30, 1974, teaches a laser measuring or monitoring system in which a reference plane is established by passing a laser beam through a lens assembly in order to create a focusable diverging planar beam of light. The reference beam is projected tangent to a cylindrical surface of an object with the beam being focused at a point closely adjacent but forward of the surface and projected onto a screen rearwardly of the object. The position of the beam is precisely controlled and any deviation in the diameter of the object is indicated as an interruption of the beam on the screen. U.S. Pat. No. 4,433,780 also teaches system for directing the light into a beam of substantially uniform rectangular cross-section.

SUMMARY OF THE INVENTION

In view of the foregoing factors and conditions which are characteristic of the prior art it is the primary object of the present invention to provide a variably curved reflector which projects a luminous line on an object by a laser beam and the use of which enables the spatial configuration of the luminous line to be selectively altered and which is of simple construction.

It is another object of the present invention to provide a variably curved reflector which is of simple construction.

In accordance with the present invention a variably curved reflector for projecting a luminous line on an object which is used with a laser system is described. The laser system provides a laser beam. The variably curved reflector includes a variably curved reflecting surface and a pair of curved side surfaces and is located at a position subsequent to the laser system. The variably curved reflecting surface has a pair of parallelly disposed peripheral edges. Each curved side surface interects along one of the peripheral edges. The variably curved reflecting surface reflects the laser beam to form a plane of light which has an angular span which is determined by the radius of curvature at the point of contact along the variably curved reflecting surface.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
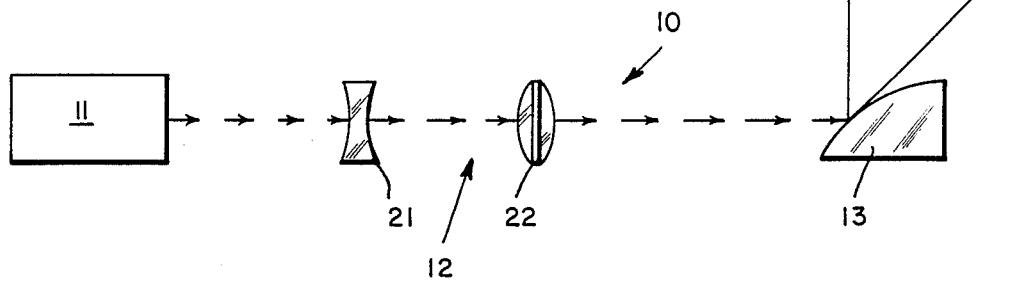
FIG. 1 is a schematic drawing of an apparatus for projecting luminous lines on an object by use of a laser beam which includes a laser system, a lens assembly and a curved reflector of the prior art.

In order to best understand the present invention it is necessary to refer to the following description of its preferred embodiment in conjunction with the accompanying drawing. Referring to FIG. 1 an apparatus 10 for projecting luminous lines on an object by use of a laser beam includes a laser system 11, a lens assembly 12 and a curved reflector 13. The laser system 11 produces a laser beam. The lens assembly 12 is located at a position subsequent to the laser system 11 and expands the laser beam. The lens assembly 12 includes a concave lens 21 and a convex lens 22. The concave lens 21 diverges the laser beam. The convex lens 22 is positioned subsequent to the concave lens 22. The convex lens 22 converges the laser beam to be of a maximum desired width. U.S. Pat. No. 4,693,567 teaches the curved reflector 13.

Figure 2:
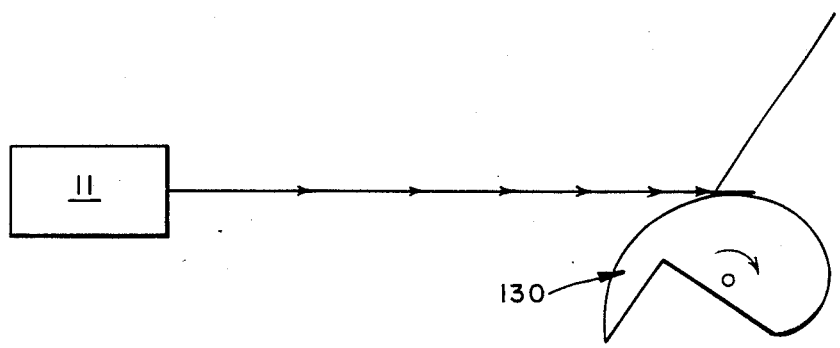
FIG. 2 is a schematic drawing of a variably curved reflector which projects a luminous line on an object for use with a laser system which provides a laser beam and which has been constructed in accordance with the principles of the present invention.

Referring to FIG. 2 a variably curved reflector 130 for projecting a luminous line on an object is used with a laser system 11 which provides a laser beam. The variably curved reflector 130 includes a variably curved reflecting surface 131 and a pair of curved side surfaces 132 and is located at a position subsequent to the laser system 11. The variably curved reflecting surface 131 has a pair of parallelly disposed peripheral edges. Each curved side surface 132 interects along one of the peripheral edges. The variably curved reflecting surface 131 reflects the laser beam to form a plane of light which has an angular span which is determined by the radius of curvature at the point of contact along the variably curved reflecting surface 131.

Figure 3:
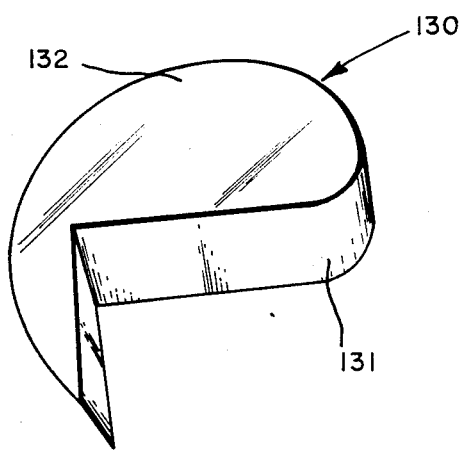
FIG. 3 is a perspective view of the variably curved reflector of FIG. 2.

Referring to FIG. 2 in conjunction with FIG. 3 the shape of the variably curved reflecting surface 131 and the pair of variably curved side surfaces 132 is similar to the shape of a French curve in order to provide a plurality of curves at different radii.

From the foregoing it can be seen that a variably curved reflector has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A variably curved reflector for projecting a luminous line on an object which is used with a laser system which provides a laser beam and which is located at a position subsequent to the laser system, said variably curved reflector comprising:
   a. a variably curved reflecting surface having a pair of parallelly disposed peripheral edges, a pair of parallel curved side surfaces each of which interects along one of said peripheral edges;
   b. means for pivoting said variably curved reflector about an axis which is orthogonal to said pair of parallel curved side surfaces whereby said variably curved reflecting surface reflects the laser beam to form a plane of light which has an angular span which is determined by the radius of curvature at the point of contact along said variably curved reflecting surface.

* * * * *